(12) United States Patent
Hirai

(10) Patent No.: US 6,768,705 B2
(45) Date of Patent: *Jul. 27, 2004

(54) OPTICAL DISK DRIVE INCLUDING A POSITIONER AND MEANS FOR COMPENSATING FOR AN ECCENTRICITY OF AN OPTICAL DISK

(75) Inventor: Yukio Hirai, Akashi (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,453

(22) Filed: Jul. 13, 1999

(65) Prior Publication Data

US 2002/0122367 A1 Sep. 5, 2002

(30) Foreign Application Priority Data

Jul. 17, 1998 (JP) .......................................... 10-203964

(51) Int. Cl.[7] .................................................. G11B 7/00
(52) U.S. Cl. ............................... 369/44.28; 369/44.29; 369/44.32; 369/44.35; 369/53.14
(58) Field of Search ........................... 369/44.28, 44.34, 369/44.35, 44.36, 44.32, 44.29, 53.14

(56) References Cited

U.S. PATENT DOCUMENTS

| | | | | |
|---|---|---|---|---|
| 4,607,358 A | * | 8/1986 | Maeda et al. ............. | 369/44.28 |
| 4,745,587 A | * | 5/1988 | Maeda et al. ............. | 369/44.28 |
| 4,745,588 A | * | 5/1988 | Yoshikawa et al. ....... | 369/44.28 |
| 4,853,915 A | * | 8/1989 | Takasago et al. ........ | 369/53.29 |
| 4,866,687 A | * | 9/1989 | Kasai et al. ............. | 369/44.11 |
| 4,958,335 A | | 9/1990 | Takeda et al. | |
| 4,977,539 A | * | 12/1990 | Lee .......................... | 369/44.11 |
| 5,121,374 A | * | 6/1992 | Barton et al. ............ | 369/44.29 |
| 5,195,067 A | * | 3/1993 | Yanagi ..................... | 369/44.28 |
| 5,233,581 A | * | 8/1993 | Suzuki ..................... | 369/44.19 |
| 5,241,522 A | * | 8/1993 | Yanagi ..................... | 369/44.28 |
| 5,258,966 A | * | 11/1993 | Yanagi ..................... | 369/44.28 |
| 5,317,559 A | * | 5/1994 | Bronsvatch ................. | 369/244 |
| 5,446,708 A | * | 8/1995 | Takebayashi et al. ..... | 369/44.29 |
| 5,517,474 A | | 5/1996 | Takamine ................. | 369/44.32 |
| 5,615,191 A | * | 3/1997 | Takeda et al. ................ | 369/58 |
| 5,745,455 A | | 4/1998 | Takeda et al. | |
| 5,875,155 A | * | 2/1999 | Sofue ....................... | 369/44.39 |
| 6,240,059 B1 | * | 5/2001 | Nguyen et al. ............. | 369/199 |
| 6,370,094 B1 | * | 4/2002 | Kishinami et al. ........ | 369/44.32 |
| 6,404,726 B1 | * | 6/2002 | Makita ........................ | 369/244 |

FOREIGN PATENT DOCUMENTS

| | | |
|---|---|---|
| EP | 0 649 132 A1 | 4/1995 |
| JP | 58171729 | 10/1983 |
| JP | 1300437 | 12/1989 |
| JP | 05303843 A | * 11/1993 |

\* cited by examiner

Primary Examiner—Thang V. Tran
(74) Attorney, Agent, or Firm—Greer, Burns & Crain, Ltd.

(57) ABSTRACT

An optical disk drive has a positioner for mounting an optical unit, such as an objective lens and a tracking error signal detector, and a motor for moving the positioner. The positioner is moved in the radial direction of the disk by the motor through gear train. The motor is driven by a signal that includes a compensating current, and this signal controls the positioner to move in accordance with any eccentric displacement of a data track as caused by misalignments between the center of the data track and the axis of the optical disk rotation. The current is synthesized with an amplitude of the eccentricity, as detected by the tracking error signal, and a phase angle, as detected by both the error signal and an index signal indicative of a reference angular position of a spindle motor for the optical disk rotation.

13 Claims, 8 Drawing Sheets

Ct : CENTER OF TRACK
Cd : CENTER OF DISK-ROTATION

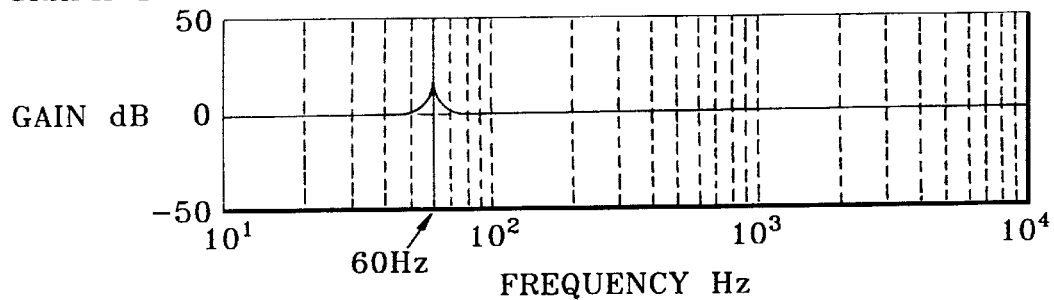
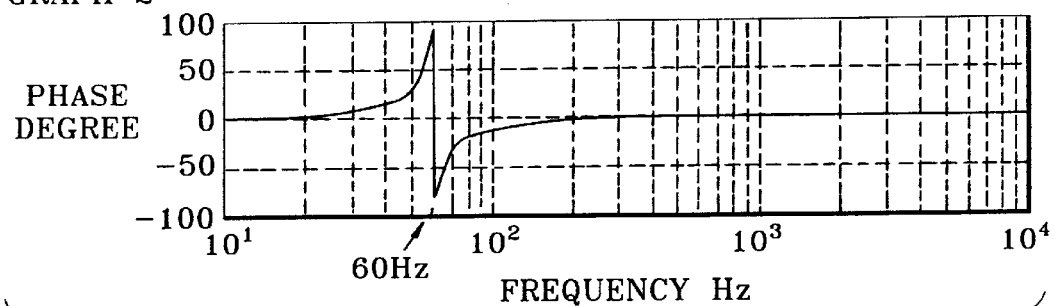
Fig. 12
Fig. 13
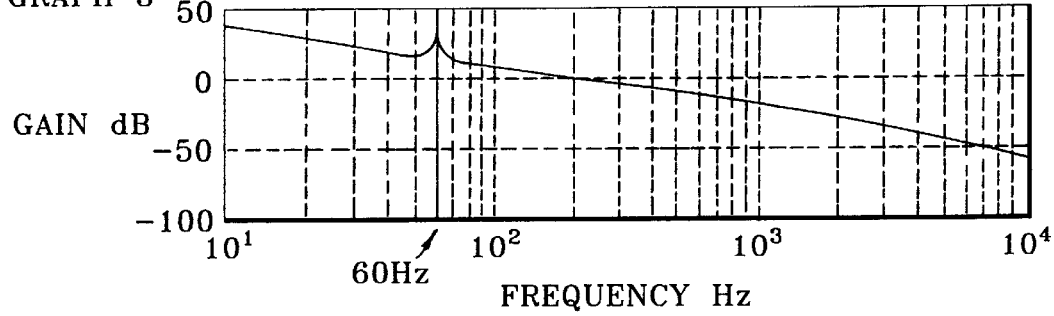
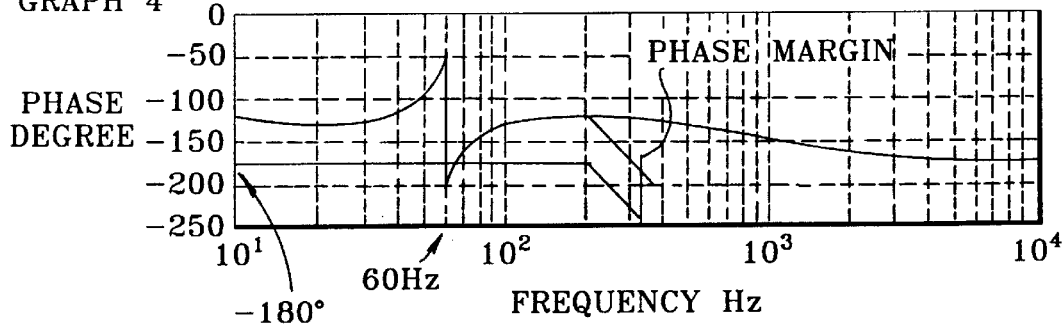

OPTICAL DISK DRIVE INCLUDING A POSITIONER AND MEANS FOR COMPENSATING FOR AN ECCENTRICITY OF AN OPTICAL DISK

BACKGROUND OF THE INVENTION

1. Field of the Invention

This invention relates to an optical disk drive. In particular, the present invention relates to an optical disk drive that compensates for eccentricities in an optical disk by controlling the position of a positioner. The positioner is driven by a motor, and an optical head is mounted thereon.

2. Description of the Related Art

An optical disk drive reads and/or writes information on tracks formed concentrically or spirally on an optical disk. The optical disk is mounted for rotation upon a turntable, which is rotated by a spindle motor, and the optical disk is rotated at a constant rotation speed about an axis of the spindle motor. A track being accessed for a read-operation and/or a write-operation is sought and tracked by positioning a small spot illuminated by a laser beam. The positioning of the small spot is carried out by both (1) a fine actuator which effects the movement of an objective lens mounted along the path of the laser beam; and (2) a coarse actuator which effects the displacement of the positioner, upon which is mounted an optical head (which includes the fine actuator, the objective lens, and the like).

It is well known that the data track often rotates eccentrically about the axis due to a miss-alignment of the center hole of the disk with a guide on the turntable for locking the disk. The miss-alignment may result from deficiencies in the machining precision of the hole and/or the guide, positional errors in assembling the turntable with the spindle motor, and/or errors in forming the track on the disk. As eccentric rotation of the track is often inherent in optical disk drives as shown above, it is necessary to compensate for this eccentric rotation when tracking the laser beam onto the desired track when data is being read and/or written from/to the disk.

There are two types of arrangements for compensating for the eccentric rotation. The first arrangement compensates for eccentric track-rotation by controlling the fine actuator which positions the small spot on the disk illuminated by the laser beam through the use of an objective lens that is moved by the fine actuator. The first arrangement is suited for use in disk drives for compact disks, which have larger track-pitches than those found in magneto-optical disks, and which also need to be inexpensive. The second arrangement compensates for the eccentric track-rotation by controlling both the fine actuator and the coarse actuator. The second arrangement is suited for use in disk drives for disks of high storage capacity, such as magneto-optical disks.

The compact disk drive having the first arrangement uses a DC motor (to lower the cost of the drive) as the coarse actuator. The DC motor is connected to the positioner by a gear train. When the eccentric rotation is compensated for by the fine actuator alone, the drive has the following problems. One problem is that of a residual position error in the fine actuator control, which results in a large error between the target position of the small spot and its actual position. A second problem is that large displacements of the objective lens for compensating for the eccentricity cause the optical axis of the objective lens to be inclined and shift, resulting in the laser beam illuminating an area off the desired track. These problems result in adversely affecting the C/N ratio (Carrier to Noise ratio), which indicates a characteristic of the write-and-read operations.

In high storage capacity disk drives, such as drives for disks having fine track pitches like magneto-optical disks, the eccentric displacement of the track is compensated for mainly by positioning the positioner. The movement of the objective lens is, hence, smaller than that found in compact disk drives. While such high capacity drives do not have the problems found in compact disk drives, these drives are expensive, in part because of the use of coarse actuators formed by large-size VCMs (Voice Coil Motors), which are made with expensive permanent magnets.

Because optical disk drives employ removable optical disks having higher data storage capacities than other removable recording media, the optical disk drive is indispensable as an external storage unit for use in information processing apparatuses. To increase the popularity of optical disks, it is necessary for the disk drive to be able to compensate for the above inherent eccentricity, and to be able to operate with disks of a high storage capacity without significantly increasing the cost of the drive.

SUMMARY OF THE INVENTION

An object of this invention is to provide an optical disk drive having an improved arrangement for compensating for eccentricities of the data tracks of the optical disk when the optical disk is rotated. In one preferred embodiment, the drive has a positioner for moving an objective lens, a motor for moving the positioner via a series of transmission gearing, a tracking error detector, an index pulse generating means, and an eccentric displacement data analyzing unit. The tracking error detector receives light reflected from the disk. The detector, hence, receives the light beam and detects a signal that includes information indicative of the number of track lines that have been crossed by the light beam when the objective lens is located in a same position. In the eccentric displacement data analyzing unit, a function indicative of the eccentricity of the disk rotation is analyzed from the signal and an index pulse supplied from the index pulse generating means, and this signal is stored in the eccentric displacement analyzing unit. A motor drive signal, which has been compensated for by the function, is supplied to the motor while the data track is being tracked by the light beam.

Other objects and advantages of the present invention will be apparent from the following description, the appending claims and accompanying drawings.

BRIEF DESCRIPTION OF THE DRAWINGS

Preferred embodiments of the present invention are described herein with reference to the drawings wherein:

FIG. 12 shows the gain and phase degree curves of a bandpass amplifier of FIGS. 9 and 10; and FIG. 13 shows the gain and phase degree curves for the second loop of FIG. 12.

DESCRIPTION OF THE PREFERRED EMBODIMENTS

Referring now to FIG. 1 to FIG. 13, preferred embodiments are shown in accordance with the present invention.

The first preferred embodiment is shown in FIG. 1 to FIG. 6. The optical disk drive of the first preferred embodiment has an arrangement in which a positioner for carrying an optical head in a radial direction of a optical disk is driven and controlled to compensate for eccentricities of the disk-rotation by a motor as a coarse actuator. The present invention is applied to an optical disk having concentrically formed data tracks that are rotated at a constant rotational speed in the first preferred embodiment. However, the present invention is also applicable to an optical disk having spiral data tracks or to disks being rotated at constant circumferential speeds. Referring now to FIG. 1 to FIG. 6, one important part of the arrangement for compensating for an eccentricity of an optical disk during tracking of data will be explained. As related arrangements for seeking the data track, focusing the laser beam, and the like are well known, they will be described only as is necessary for a full understanding of this invention.

Figure 1A:
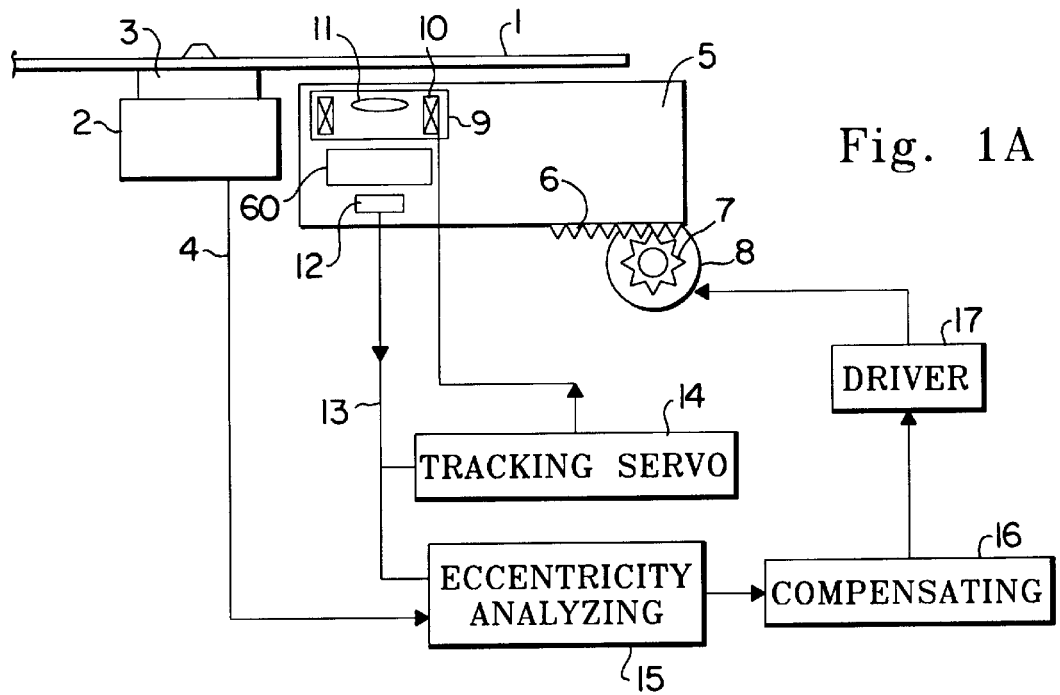
FIG. 1A shows a schematic diagram of an important part of the first embodiment of the present invention.

FIG. 1A shows a schematic of an important part of the optical disk drive of the first preferred embodiment. An optical disk 1 is mounted upon a turntable 3 which is connected to a spindle motor 2. The spindle motor 2 includes an index generating means, which generates index pulses with an optical detector or a magnetic detector, at predetermined angular positions along the rotation of the spindle motor 2. The index pulses are used for controlling rotation of the spindle motor in order to maintain a constant rotation, such as 3,600 rpm. A single pulse out of the index pulses is used as an index pulse 4 for compensating for the eccentricity in the first embodiment. One index pulse 4 is generated for each rotation of the spindle motor 2.

Figure 1B:
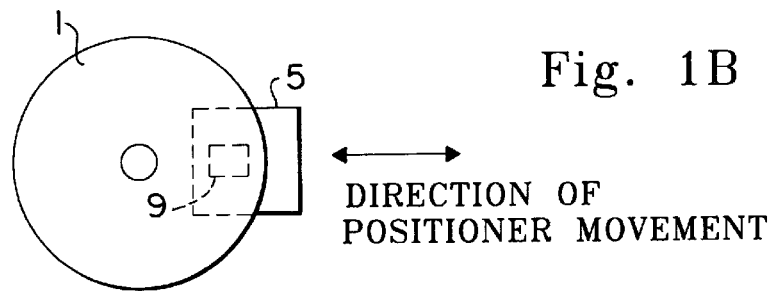
FIG. 1B shows a schematic diagram for explaining the positional relationship of parts of this first embodiment.

A rack 6 (mounted on the positioner 5) meshes with a pinion 7 (mounted on a rotary shaft of a motor 8). The gear train that includes the pinion 7 and the rack 6 transfers the forward and reverse rotations of the motor 8 to the positioner 5. The position of the positioner 5 is controlled by the rotation of the motor 8 in the radial direction of the optical disk 1 as shown in FIG. 1B. The details of the mechanical arrangement will be described hereinafter.

Referring back to FIG. 1A, one can see that within the positioner 5 are mounted an optical unit 60, an actuator unit 9, and a tracking error signal detector 12. An objective lens 11, which focuses the laser beam on to the optical disk, forms the optical unit 60. A tracking coil 10, which operates as a fine actuator, effects the movement of the objective lens 11 in the direction across the data track. The actuator unit 9 also includes a focusing coil (not shown) for moving the objective lens in the direction perpendicular to a surface of the optical disk 1. Moving the objective lens in this manner moves the position of the focal point of the laser beam. The focusing coil is able to detect a focus error signal, which will be explained hereinafter, even in a case of the surface of the optical disk 1 being run-out from a reference surface. In FIGS. 1A and 1B, a related arrangement with the focusing coil is not shown because it is well known and is not directly related to the present invention. The tracking error signal detector 12 receives a reflected laser beam from the disk 1 and provides a track error signal 13 to a tracking servo unit 14. The track error signal 13 has information that indicates the displacement between a data track and a small spot illuminated by the laser beam. The tracking servo unit 14 supplies a current to the tracking coil 10 for moving the objective lens 11 to maintain the tracking error signal 13 within a predetermined range.

An arrangement for eccentricity compensation will now be described. Before a write-operation and/or a read-operation, the tracking operation is disabled, the focusing operation is enabled, and an eccentric displacement analyzing unit 15 receives the index signal 4 from the spindle motor 2. The eccentric displacement analyzing unit 15 also receives the tracking error signal 13 from the tracking error signal detector 12. In the eccentric displacement analyzing unit 15, an amplitude which indicates the maximum displacement of the eccentricity, and a phase angle φ, which indicates the angular position between the index signal 4 and the optical disk 1, are analyzed from a combination of the tracking error signal 13 and the index signal 4. A reference waveform (which is usually a sine wave) is stored in the eccentric displacement analyzing unit 15, and is deformed into a first adjusted eccentricity function. The first adjusted eccentricity function is also adjusted in the compensation unit 16 by a mechanical and electrical time-lag, and also by the gain resulting from the arrangement from the driver 17 to the objective lens 11 through the motor 8 and the like. The compensation unit 16 supplies to the driver 17 a drive signal for compensating for the eccentricity of disk rotation by moving the positioner 5.

Figure 2:
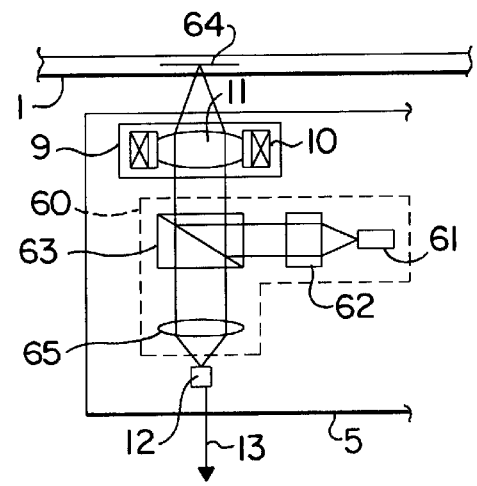
FIG. 2 shows a schematic diagram of the arrangement of components that are located near the actuator.

Referring now to FIG. 2 to FIG. 5, more detailed descriptions of the above explanation will now be shown. FIG. 2 shows schematically the arrangement of the components in the vicinity of the actuator unit 9 and the optical unit 60 (which is indicated by a dotted line). The read-operation of the optical unit 60 will be briefly described. A laser beam is emitted from a laser diode 61 and is transformed into parallel rays of the laser beam by a collimator lens 62. The laser beam is reflected by a beam splitter 63 to an optical path toward the objective lens 11, which is mounted within the actuator unit 9. The laser beam is focused in the vicinity of a data recording layer 64 on the optical disk 1 by the objective lens 11, and the laser beam is then reflected back from the disk 1. The reflected laser beam is modulated optically by data recorded on the track in the data recording layer 64. The reflected laser beam travels through the objective lens 11, the beam splitter 63, and a convergent lens 65 to the tracking error signal detector 12, which has two photo-diodes. In the tracking error signal detector 12, signals from each photo-diode are supplied to a differential amplifier, and the differential amplifier outputs the tracking error signal 13. The tracking error signal detector 12 may alternately include four photo-diodes. A detector for monitoring the quantity of light, and a bending mirror to deflect the optical path are not shown in FIG. 2 because these components should be known to one of ordinary skill in the art.

Figure 3A:
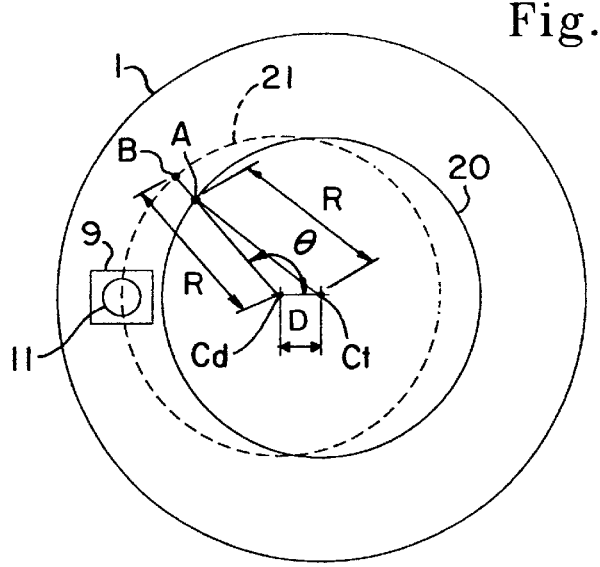
FIG. 3A is a schematic diagram showing the positional relationship for explaining an eccentricity of the disk.
Figure 3B:
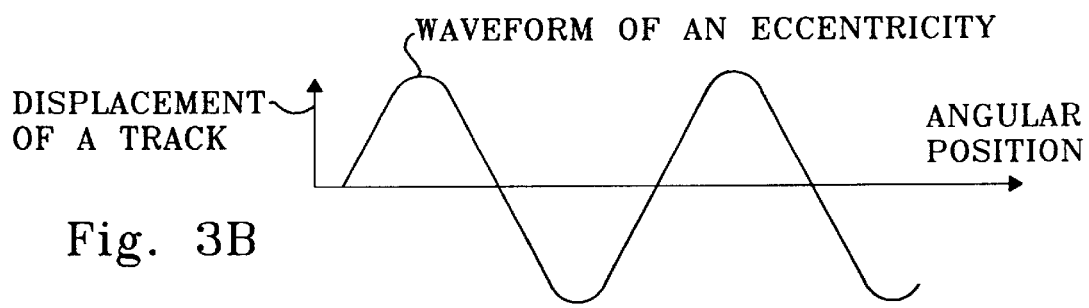
FIG. 3B shows a function of an eccentricity resulting from the positional relationship shown in FIG. 3A.

Referring now to FIGS. 3A and 3B, the eccentricity of the disk rotation will be explained. FIG. 3A shows the geometrical relationship among the position of the objective lens 11, the data-track-circle 21, the center Ct of the data-track circle 21, and the center Cd of rotation. If the optical disk 1 is rotated while the objective lens 11 is maintained at the same position, the laser beam from the objective lens 11 illuminates a portion of the disk 1 along a circle 21, which is indicated by the dotted circle having a radius R. A circle 20 which has a radius R and a rotational center Cd indicates the data track desired to be accessed. If there is no offset between both centers Ct and Cd, the laser beam will illuminate a portion on the circle 20.

When a portion B on the circle 21 moves to the position being illuminated by the laser beam, and the objective lens 11 shifts a distance AB toward the center of rotation, the laser beam can illuminate the desired track. The distance AB is represented as a simplified function D×cosθ, where θ indicates the angle measured counterclockwise from a base line, and D is the distance between Cd and Ct. A waveform of the eccentricity is generally in the shape of a sine wave like that shown in FIG. 3B.

Figure 4:
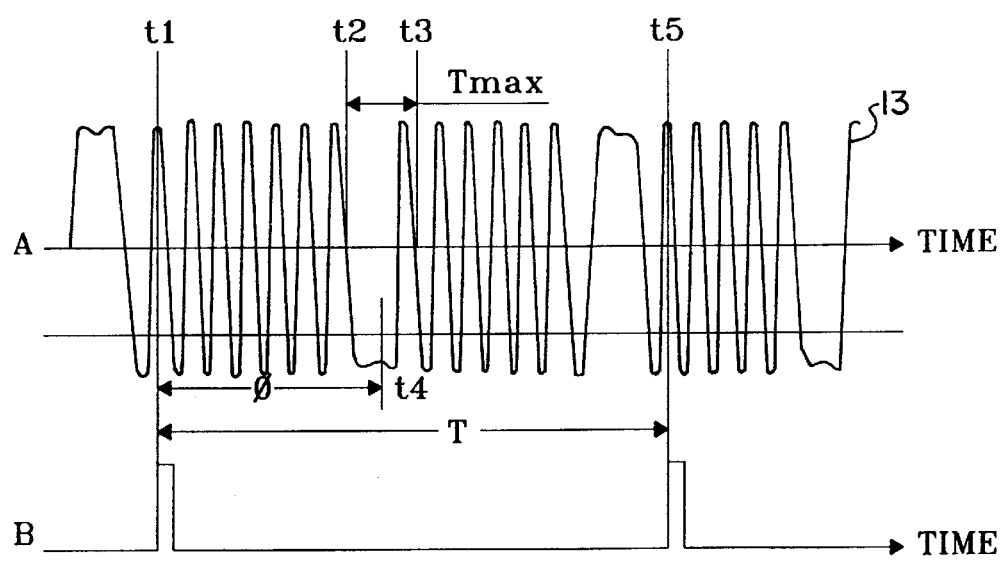
FIG. 4 shows schematic diagrams of a signal detected by a tracking error signal and an index pulse generated by an index pulse generating means.
Figure 5:
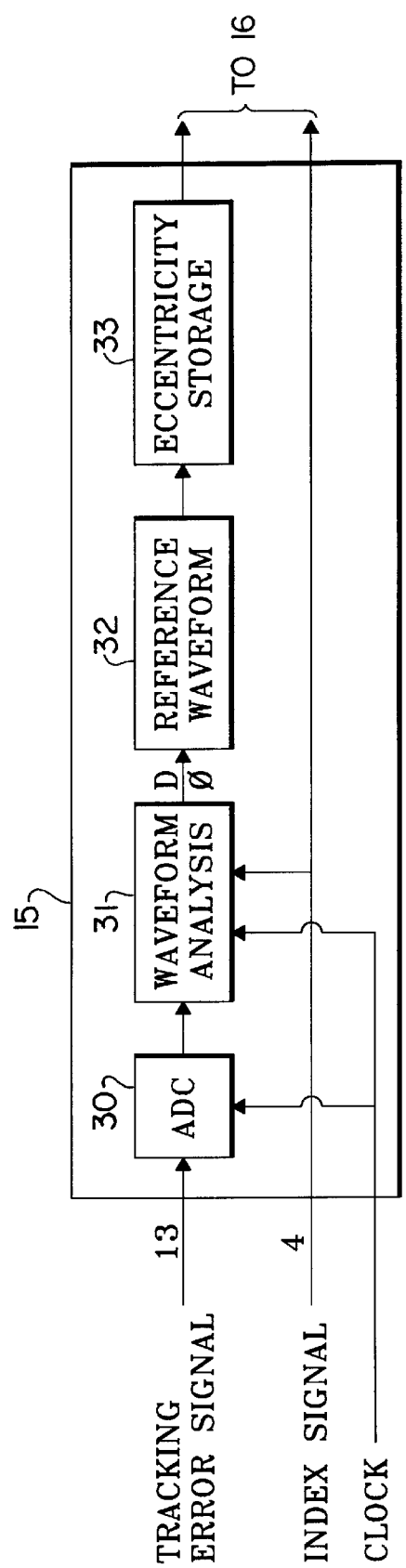
FIG. 5 shows a schematic block diagram of an eccentric displacement analyzing unit.

Referring next to FIG. 4 and FIG. 5, an arrangement for detecting a maximum eccentricity and a phase φ will be described. Along line A is a tracking error signal 13 of a tracking servo being disabled, and along line B is an index signal 4. Along line A, the waveform of the tracking error signal 13 varies with a period T of the rotation of the disk 1. The period T is detected by the index pulse 4. A number N of data tracks which cross the portion illuminated by the laser beam are counted by applying the zero-crossing to the tracking error signal 13. The eccentricity D (FIG. 3A) of the optical disk 1 is represented by D=(N×Tp)/2, where Tp is a track pitch.

In the first preferred embodiment, the phase angle φ is defined as the time difference between the index signal 4 and a value t4 (FIG. 4) which is the time of the middle point of t2 and t3, both of which give the maximum period of the tracking error signal 13.

Referring now to FIG. 5, the eccentric displacement analyzing unit 15 will be explained. The tracking error signal 13 is supplied to the eccentric displacement analyzing unit 15 from the tracking error signal detector 12 and is transformed into digital data by ADC 30. The digitized tracking error signal is analyzed in a wave form analyzing unit 31, which gives the eccentricity D and the phase angle φ. A reference waveform stored in the reference waveform storage unit 32 is transformed into a first adjusted eccentricity function by the eccentricity D and the phase angle φ. For example, the first adjusted eccentricity function will become D×sin(θ−φ), where the reference waveform is sin θ. The first adjusted eccentricity function is stored in the form of a table in the eccentricity storage unit 33. The first adjusted eccentricity function is still further adjusted in the compensation unit 16 for the mechanical and electrical time lag, and for the gain resulting from the arrangement from the driver 17 to the objective lens 11 through the motor 8. This further adjusted function is stored as a second adjusted eccentricity function in the compensation unit 16. For example, the second adjusted eccentricity function stored in the compensation unit 16 is in a digital form of D'×sin(θ−φ').

The compensation unit 16 supplies a signal to the driver 17 according to the second adjusted eccentricity function by using the index signal 4 as a trigger. The movement of the positioner 5, which is controlled by the signal when the focusing servo and the tracking servo are enabled, compensates for the eccentricity of disk rotation.

The first and second adjusted eccentricity functions may be calculated from the eccentricity D and the phase angle φ during each rotation, and in the present preferred embodiment these calculations are stored.

The eccentricity analyzing unit may be composed of a micro-computer and/or a digital signal processor, instead of being composed of the components just discussed, such as the ADC 30 and the like.

Figure 6:
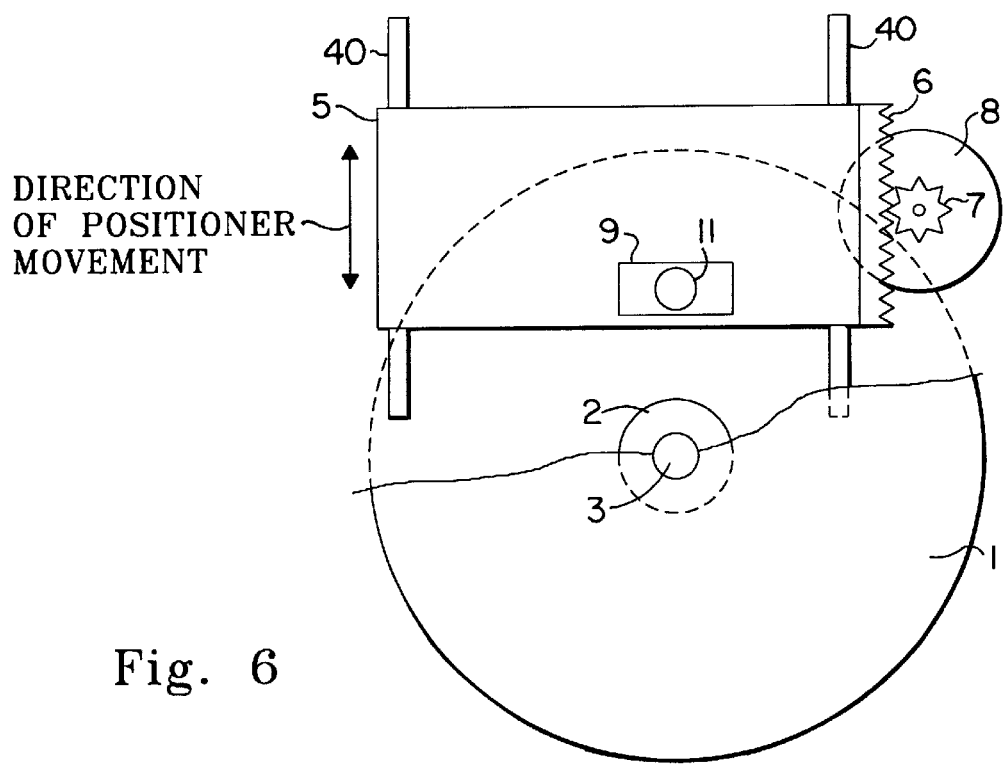
FIG. 6 shows a schematic diagram of an arrangement of another positioner of the first preferred embodiment.

Referring now to FIG. 6, details of the positioner 5 will be described. The positioner 5 is mounted under the optical disk 1 in the optical disk drive, and is supported and guided by a pair of shafts 40. The motor 8 moves the positioner 5 through the gear train of the pinion 7 and the rack 6. The pinion 7 is mounted on the shaft of the motor 8, and the rack 6 is mounted on the positioner 5. Instead of using the motor and rack configuration shown in FIG. 1, different configurations which can reduce the thickness of the drive is also contemplated. Instead of using the rack 6 and the pinion 7, a ball screw connected to the motor 8 and a threaded nut connected to the positioner 5 may be used. Although not shown, an arrangement for preventing backlash resulting from space between the teeth of the pair of gears may be mounting on the rack 6 or the pinion 7.

The information related to eccentricity is obtained not only at the time of loading the optical disk 1 in the drive, but also periodically at other times in accordance with instructions from other devices. In addition, it is also preferable to obtain the eccentricity information when the number of misses during reading and/or writing exceeds a predetermined number, which prevents errors in compensation during the operation of the disk drive.

The present invention is applicable to magneto-optical disk drives having a magnet for erasing data written on the data track and also to drives capable of performing writing and/or reading operations with a laser beam transmitted to an optical disk. And furthermore, some parts of the optical unit 60, such as the laser diode 61 and the collimator lens 62, may be separately mounted in other areas within the drive.

As the motion of the positioner driven by a low cost motor compensates for the eccentricity of the optical disk, the present invention helps to lower the overall cost of the optical disk drive. Because the amount of the displacement of the objective lens is decreased by the displacement of the positioner, the inclination and shift of the optical axis of the objective lens are decreased, and the performance of the read-operation and/or the write-operation is increased as compared with the compact disk drive. Furthermore, as the first preferred embodiment provides an arrangement for detecting the eccentric information, D and θ, from the tracking error signal without using a specific sensor, such as a sensor to detect the distance between the positioner and the actuator, the invention lowers the cost of the optical disk drive in this way also. And still further, the first preferred embodiment provides an arrangement in which the positioner is moved by the motor through a pair of gears. The smaller the number of gears in the train, the higher the natural frequency of the train becomes. With a high natural frequency, problems such as a vibration do not occur until reaching a relatively high speed of rotation. Hence this embodiment also provides an arrangement that makes it possible to rotate the disk at a higher speed of rotation, which permits the performance of data read and/or write operations in a shorter period of time.

Figure 7:
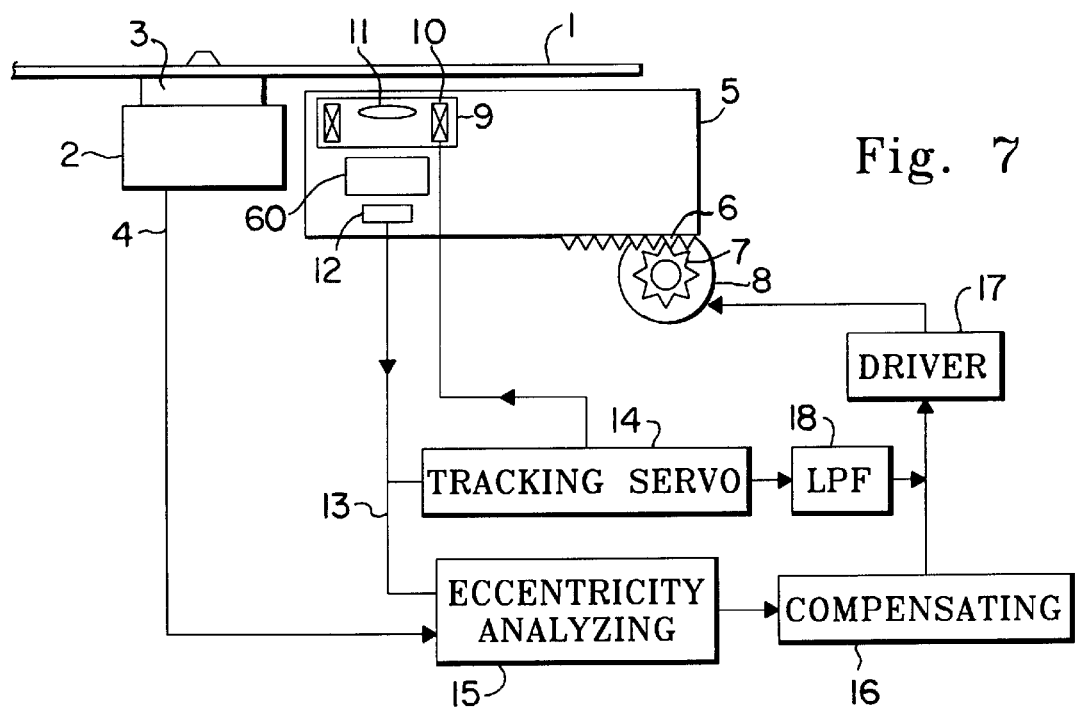
FIG. 7 shows a schematic diagram of an arrangement of an important part of a second preferred embodiment of the present invention.

Referring now to FIG. 7, a second preferred embodiment will be explained. Mechanical shocks accidentally added to the optical disk drive may cause a displacement of the positioner, and that displacement results in an additional offset that needs to be added to the movement of the objective lens in order to properly track data along a track. As the offset varies the range of displacement of the objective lens, an arrangement for canceling the offset is important for the optical disk. The second preferred embodiment has an arrangement for canceling the offset in the movement of the objective lens caused by an unexpected displacement of the positioner, in addition to the other benefits provided by the first preferred embodiment.

The relative displacement of the objective lens 11 from its neutral position, and its direction, are detected from the amount of current, and its sign, which are supplied to the tracking coil 10 from the track servo unit 14, because the objective lens 11 is positioned by the current. When the tracking servo is active and an unexpected displacement occurs to the positioner 5, an offset current is supplied to the tracking coil 10 to compensate for the unexpected displacement. As the frequency of the offset current is lower than the frequency of rotation of the optical disk 1, the offset current is detected as an output signal of a low pass filter 18. This output signal is supplied to the driver 17. The driver 17 in turn supplies the motor 8 with a control signal that corresponds to the output signals of the compensating unit 16 and the low pass filter 18.

The second preferred embodiment provides an optical disk drive which has the ability to cancel an offset displacement of an objective lens caused by an unexpected displacement of the positioner, in addition to the other benefits provided by the first preferred embodiment. The second preferred embodiment can also detect the relative displacement of the objective lens without a specific sensor, such as a sensor which has one photo emitting diode and two optical detectors and outputs a signal related to a displacement detected by a difference of light quantities respectively received by the optical detectors.

Figure 8:
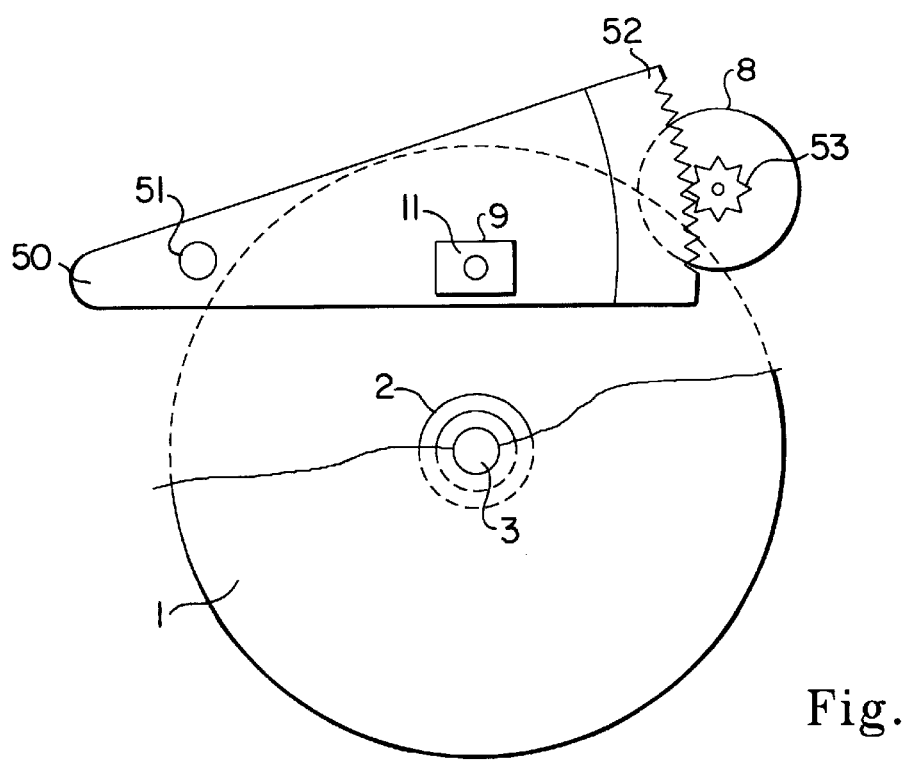
FIG. 8 shows a schematic diagram of an arrangement of an important part of a third preferred embodiment of the present invention.

Referring to FIG. 8, the third preferred embodiment will be explained. As this embodiment relates to a preferable positioner, FIG. 8 shows an important part of the positioner and its related parts. A positioner 50 includes the actuator 9, the objective lens 11, a bearing 51 and a sector gear 52. The sector gear 52 is located at one end of the positioner 50 and is pivotable about an axis mating with the bearing 51. The axis is mounted to a base plate (not shown) of the optical disk drive. A gear 53 mounted on an axis of the motor 8 mates with the sector gear 52. As the motor 8 drives the positioner 50 in the direction across the data tracks formed on the optical disk 1, the objective lens 11 can be positioned to track a desired data track.

In addition to the benefits provided by the first preferred embodiment, the third preferred embodiment also realizes a cost savings resulting from its simplified arrangement of the positioner, and also realizes an electric power savings resulting from directly transferring the rotation of the motor 8 to the positioner without first transforming this rotation into linear movement.

Figure 9:
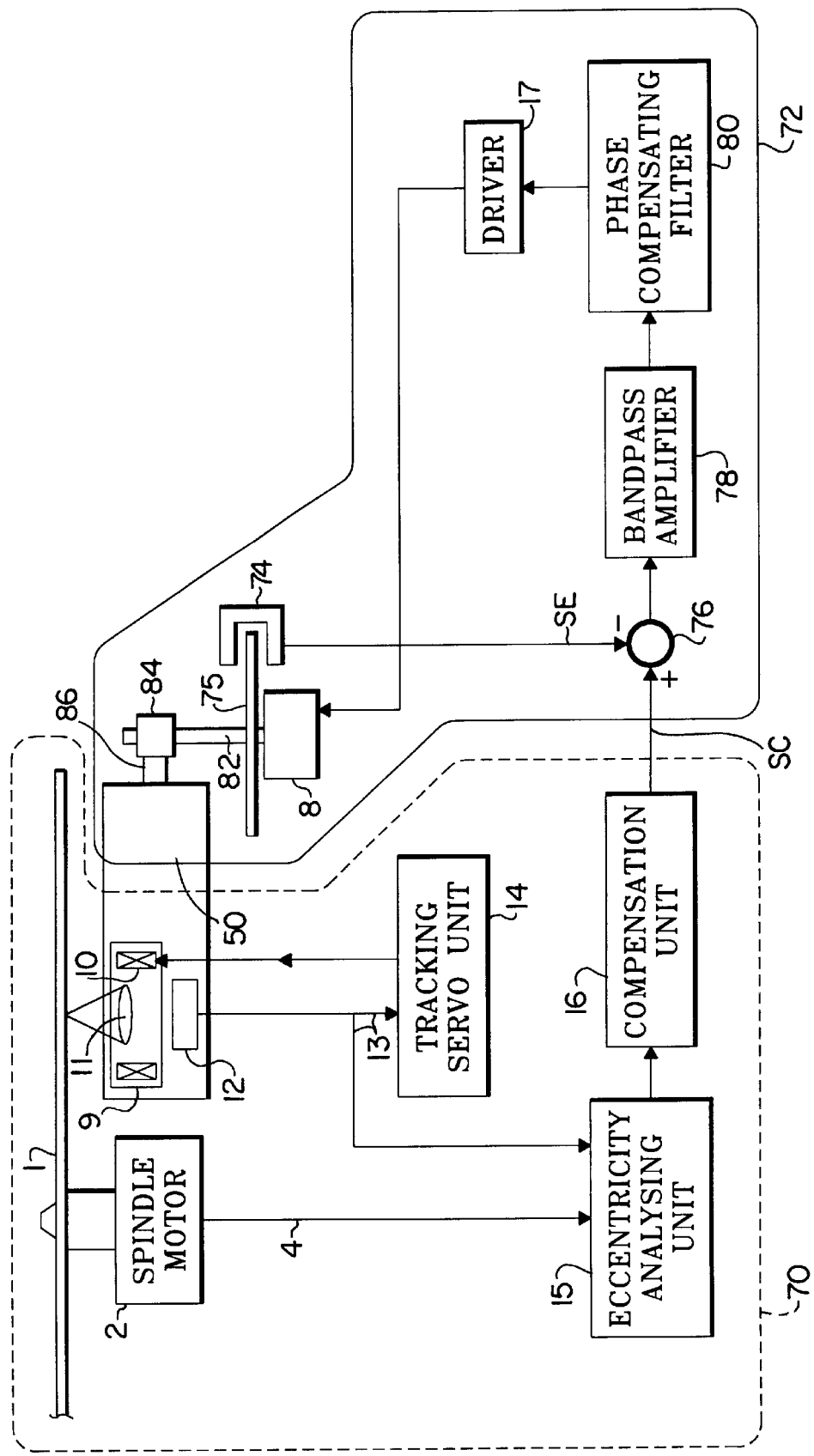
FIG. 9 shows a schematic diagram of an important part of a fourth embodiment of the present invention.

Referring to FIG. 9, a fourth preferred embodiment of the present invention will be described. Features shown within the dotted line 70 are the same as those found in the FIG. 1 embodiment, and have been given the same index numbers as in FIG. 1. As these features have been described with respect to the FIG. 1 embodiment, they will not be described again. The majority of the features shown within the solid line 72 are new to this fourth embodiment, and therefore have been given new index numbers. However, certain features, such as the driver 17, are similar to those found in the FIG. 1 embodiment, and therefore have been given the same index numbers as those of FIG. 1.

For decreasing an error between a desired value and a measured value in a feedback control system, a higher loop gain will be better. But it is generally difficult to increase a gain over a band under the natural frequency in case where a system includes mechanical parts, because increasing the gain results in occurring an unnecessary resonance at the natural frequency. The fourth preferred embodiment provides an optical disk drive for decreasing the error in a feedback control system which has a high gain in a necessary narrow band.

Figure 11:
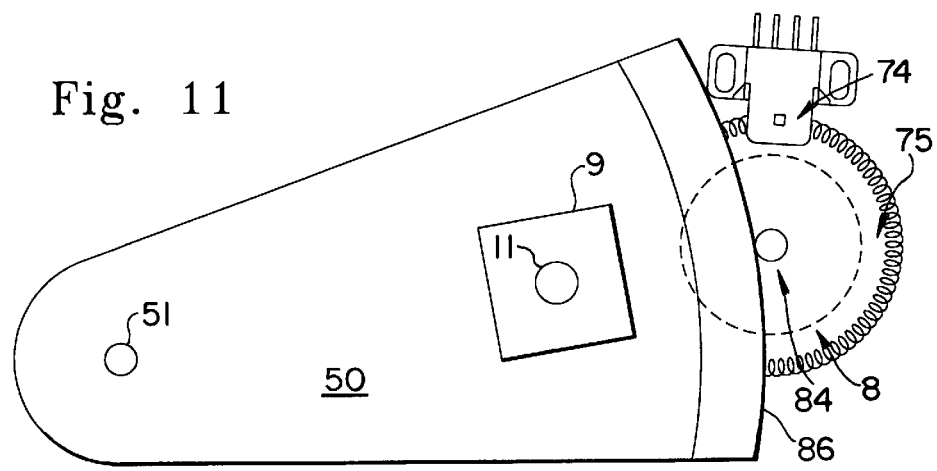
FIG. 11 shows a schematic diagram of an arrangement of a positioner and an optical sensor unit.

In this embodiment, an optical sensor unit 74 (which includes a light emitter and a photodetector) detects the angle and direction of the rotation of the motor 8, and outputs a signal SE that indicates the angular position of the positioner 50 (which is better shown in FIG. 11). Also better shown in FIG. 11 is a shaft-mounted disk 75, which is mounted upon a shaft 82, which is driven by motor 8. The shaft-mounted disk 75 includes thereon an alternating pattern of opaque portions and transparent portions. The photodetector detects when light emitted from the light emitter passes through the transparent portions of the shaft-mounted disk 75 in order to determine the angle and direction of the motor 8 and the positioner 50. For detecting the angle and direction of the rotation of the motor 8, a magnetic sensor, which uses Hall effect, is also available in the fourth preferred embodiment.

Referring back to FIG. 9, an adder 76 subtracts the signal SE from the signal SC (the output signal of the compensation unit 16). This signal is then input into a bandpass amplifier 78. The bandpass amplifier 78 amplifies signals within a particular band of frequencies. In this embodiment, the frequency band amplified is selected to include the rotational frequency of the optical disk, which may be, for example, 60 rotations per second. Additionally, the center frequency of the band amplified may be varied for constant linear velocity rotation of the disk and zone constant linear velocity rotation of the disk. The gain and phase characteristics of examples of bandpass amplifiers are shown in FIG. 12, which will be explained below.

Returning to FIG. 9, the signal output from the bandpass amplifier 78 is input to a phase compensation filter 80. The phase compensation filter 80 is used for stabilizing control and reducing the steady-state error. More specifically, the phase compensation filter 80 increases the phase margin at a phase degree (180°), and increases the gain over a low frequency band.

Next, the signal output from the phase compensation filter 80 is input into the driver 17, which is similar to the driver 17 of FIG. 1A. The driver 17 then drives the motor 8, which in turn rotates the shaft 82 and gear 84. Gear 84 is part of a gear train that includes gear 86, which is located on the positioner 50, as shown in FIG. 11.

The features enclosed by the solid line 72 decrease the difference between the signals SC and SE (SC–SE) so that the positioner 50 can be moved in a synchronous manner with the eccentricity displacement, without raising the gain in the low frequency range. Such increases in the gain tend to induce unwanted mechanical resonance.

Figure 10:
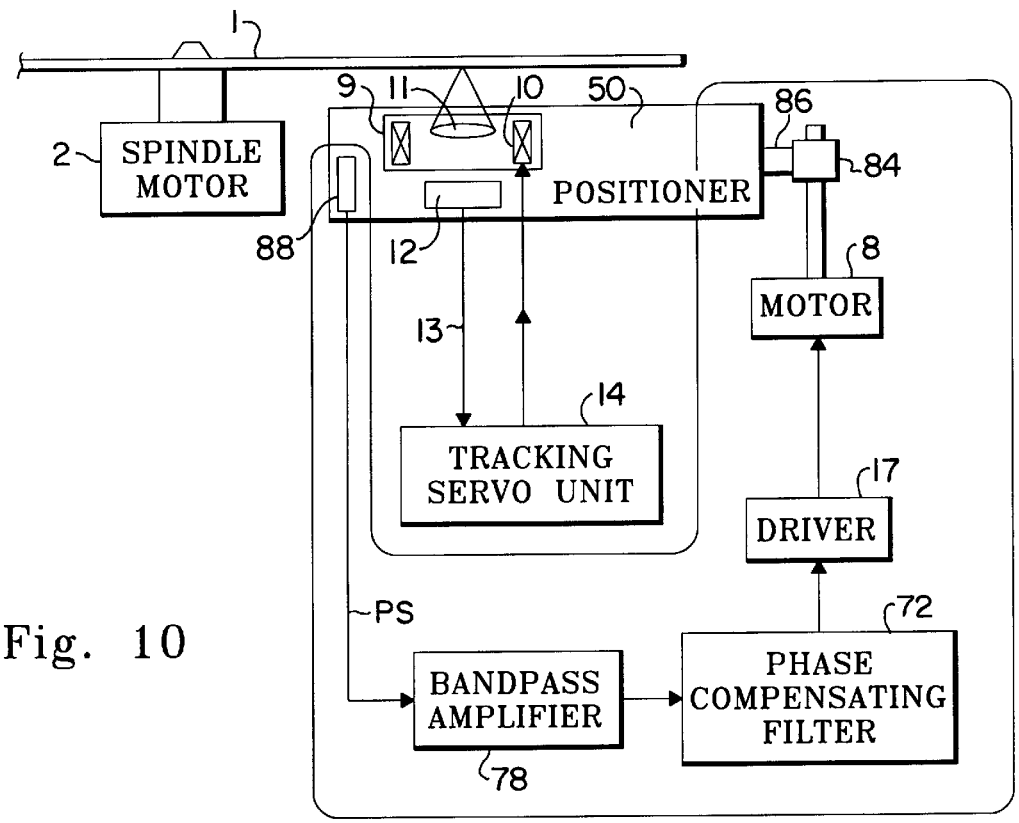
FIG. 10 shows a schematic diagram of a fifth embodiment of the present invention, in which two servo loops are utilized.

FIG. 10 shows a fifth embodiment of the present invention. Once again, like elements have been given the same index numbers used in earlier embodiments. In this embodiment, two servo loops are used. The first loop (between the TES detector 12, the tracking servo unit 14, and the tracking coil 10) is a conventional tracking servo loop, and need not be explained further. However, the second loop (between a position sensor 88, the bandpass amplifier 78, the phase compensation filter 72, the driver 17, the motor 8, the gears 84 and 86, and the positioner 50) is one of the features of this embodiment of the present invention.

In this second loop, the position sensor 88 (which may be, for example, a lens position sensor) detects a variation in the distance between the objective lens 11 and the positioner 5, and transmits this variation as a positional signal (PS) to the bandpass amplifier 78. The bandpass amplifier 78 amplifies signals within a particular frequency band in the same manner as described above. The phase compensation filter 72, the driver 17, the motor 8, and the gears 84 and 86 also perform in the same manner as described above while referencing earlier embodiments. In this embodiment, the positional signal PS functions as an error signal, and the bandpass amplifier 78 amplifies the signal of the frequency of the eccentricity. Thus, this second loop decreases the error caused by the eccentricity so that the positioner can by moved in a synchronous manner with the displacement of the eccentricity.

A more detailed explanation of the bandpass amplifier 78 and the second loop will now be provided. Because the transfer function of the amplifier and the second loop are characterized, respectively, by a gain curve and a phase curve, one gain curve (graph 1) and one phase curve (graph 2) are depicted in FIG. 12 for the bandpass amplifier, and one gain curve (graph 3) and one phase curve (graph 4) are depicted in FIG. 13 for the second loop. In each of the graphs, the horizontal axis represents the frequency in Hertz (Hz). In graphs 1 and 3, the gain, in decibels (dB) is shown on the vertical axis, and in graphs 2 and 4, the phase angle (in degrees) is shown on the vertical axis.

Referring first to FIG. 12, the gain of the bandpass amplifier peaks at 60 Hz, as shown in graph 1, with a gain of greater than 0 dB within a small range surrounding 60 Hz, which is the rotational frequency of the optical disk. Thus, only signals having the frequency within this relatively small range are amplified by the bandpass amplifier 78. The transfer function of the bandpass amplifier preferably has the following equation:

$$(S^2+2\zeta\omega S+\omega^2)/(S^2+\omega^2)$$

where: $\omega$ is the rotational frequency of the disk; and $\zeta$ is the damping coefficient.

The phase characteristics in graph 2 show that the bandpass amplifier 78 does not include any disadvantages that would affect the stability.

Referring now to FIG. 13, the gain and phase characteristics of the loop transfer function of the loops enclosed by the solid lines in FIGS. 9 and 10 are depicted. The gain curve of graph 3 shows that the gain at 60 Hz is raised by the bandpass amplifier. The phase curve of graph 4 shows that there is a phase margin, as indicated in the graph, which provides for stable control.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An optical disk drive for use with an optical disk, comprising:

a positioner for moving an objective lens in such a direction so as to move an optical spot across a data track formed on said optical disk, wherein said optical spot is caused by irradiating an optical beam through said objective lens onto said optical disk;

a motor for carrying said positioner in said direction through transmission gearing, wherein said transmission gearing includes a pair of meshed gears, one of which is mounted to said positioner;

a tracking error detector for receiving said optical beam reflected from said optical disk and for detecting a track error signal representing a degree of positional coincidence between said optical spot and said data track;

an index pulse generating means for generating an index signal indicating at least one revolution of said optical disk;

an eccentric displacement data analyzing unit for storing eccentric displacement data indicating a magnitude and a phase angle of said optical disk eccentricity, wherein said eccentric displacement data is produced from a combination of said track error signal and said index signal; and wherein said motor is controlled by a driving signal produced from said eccentric displacement data while said data track is being tracked by said optical beam; and further wherein said optical disk drive further includes:

an actuator mounted upon said positioner, said actuator being capable of moving said objective lens across a data track on said optical disk as well as perpendicular to said optical disk;

a position detecting means for detecting a position signal indicating a distance between said positioner and said actuator in said direction;

a compensating signal generating means for generating a low-passed signal from said position-signal; and wherein said motor is controlled by said driving signal combined with said low-passed signal.

2. The optical disk drive according to claim 1 comprising:

a tracking servo unit for supplying a current to an actuator for moving the objective lens, wherein the current is determined by said tract error signal.

3. The optical disk drive according claim 1, wherein said eccentric displacement data analyzing unit includes eccentric displacement reference data composed of a sampled sinusoidal wave, and a magnitude of said eccentric displacement reference data is adjusted by said eccentric displacement data.

4. The optical disk drive according to claim 1 wherein said meshed gears include a rack mounted to said positioner and a pinion mounted for rotation with said motor.

5. The optical disk drive according to claim 1 wherein said meshed gears include a sector gear located on one end of said positioner and a rotary gear mounted for rotation with said motor.

6. The optical disk drive according to the claim 1, wherein said positioner is pivotally supported to be pivoted by said motor in a plane parallel to said optical disk.

7. The optical disk drive according to the claim 1, wherein said position detecting means detects said position-signal from a current flowing in a tracking coil mounted in said actuator.

8. An optical disk drive for use with an optical disk, comprising:

a positioner for moving an objective lens in such a direction so as to move an optical spot across a data track formed on said optical disk, wherein said optical spot is caused by irradiating an optical beam through said objective lens onto said optical disk;

a motor for carrying said positioner in said direction through transmission gearing;

a tracking error detector for receiving said optical beam reflected from said optical disk and for detecting a track error signal representing a degree of positional coincidence between said optical spot and said data track;

an index pulse generating means for generating an index signal indicating at least one revolution of said optical disk;

an eccentric displacement data analyzing unit for storing eccentric displacement data indicating a magnitude and a phase angle of said optical disk eccentricity, wherein said eccentric displacement data is produced from a combination of said track error signal and said index signal;

a sensor unit for detecting the angle and direction of rotation of said motor;

a bandpass amplifier for amplifying signals, which are based upon subtracting signals generated by said sensor unit from the driving signals produced from said eccentric displacement data, within a particular band of frequencies that includes the rotational frequency of the optical disk, the bandpass amplifier having a variable gain and variable phase margin over the band of frequencies; and a phase compensation filter for increasing the phase margin of the amplified signals at a phase degree and for increasing the gain of the amplified signals over a low frequency band within the band of frequencies;

wherein said driving signal is fed through said bandpass amplifier and said phase compensating filter prior to reaching said motor; and further wherein said motor is controlled by a driving signal produced from said eccentric displacement data while said data track is being tracked by said optical beam.

9. The optical disk drive according to claim 8 further comprising:

a shaft-mounted disk connected to a shaft on said motor, said shaft-mounted disk including an alternating pattern of opaque portions and transparent portions configured to be detected by said optical sensor unit.

10. An optical disk drive for use with an optical disk, comprising:

a positioner for moving an objective lens in such a direction so as to move an optical spot across a data track formed on said optical disk, wherein said optical spot is caused by irradiating an optical beam through said objective lens onto said optical disk;

a motor for carrying said positioner in said direction through transmission gearing;

a tracking error detector for receiving said optical beam reflected from said optical disk and for detecting a track error signal representing a degree of positional coincidence between said optical spot and said data track;

an index pulse generating means for generating an index signal indicating at least one revolution of said optical disk;

an eccentric displacement data analyzing unit for storing eccentric displacement data indicating a magnitude and a phase angle of said optical disk eccentricity, wherein said eccentric displacement data is produced from a combination of said track error signal and said index signal;

a bandpass amplifier for amplifying signals that include an indication of the angle and direction of rotation of said motor within a particular band of frequencies that includes the rotational frequency of the optical disk, the amplified signals having a variable gain and a variable phase margin over the band of frequencies; and a phase compensation filter for increasing the phase margin of the amplified signals at a phase degree and for increasing the gain of the amplified signals over a low frequency band within the band of frequencies;

wherein said driving signal is fed through said bandpass amplifier and said phase compensating filter prior to reaching said motor; and wherein said motor is controlled by a driving signal produced from said eccentric displacement data while said data track is being tracked by said optical beam.

11. An optical disk drive for use with an optical disk, comprising:

a positioner for moving an objective lens in such a direction so as to move an optical spot across a data track formed on said optical disk, wherein said optical spot is caused by irradiating an optical beam through said objective lens onto said optical disk;

a motor for carrying said positioner in said direction through transmission gearing;

a bandpass amplifier for amplifying signals that include a variation in a distance between said objective lens and said positioner within a particular band of frequencies that includes the rotational frequency of the optical disk; and a phase compensation filter for increasing the phase margin at a phase degree and for increasing the gain over a low frequency band; and a servo loop defined between a position sensor for detecting a variation in the distance between said objective lens and said positioner, said bandpass amplifier, said phase compensation filter, and a driver which supplies a driving signal to said motor.

12. An optical disk drive for use with an optical disk, comprising:

a pivotable positioner, upon which an object lens is seated, said positioner being configured for moving said objective lens in such a direction so as to move an optical spot across a data track formed on said optical disk, wherein said optical spot is caused by irradiating an optical beam through said objective lens onto said optical disk;

a motor for carrying said positioner in said direction through transmission gearing;

a tracking error detector for receiving said optical beam reflected from said optical disk and for detecting a track error signal representing a degree of positional coincidence between said optical spot and said data track;

an index pulse generating means for generating an index signal indicating at least one revolution of said optical disk;

an eccentric displacement data analyzing unit for storing eccentric displacement data indicating a magnitude and a phase angle of said optical disk eccentricity, wherein said eccentric displacement data is produced from a combination of said track error signal and said index signal;

wherein said motor is controlled by a driving signal produced from said eccentric displacement data while said data track is being tracked by said optical beam; and wherein said transmission gearing includes a sector gear located on one end of said positioner and a rotary gear mounted for rotation with said motor.

13. The optical disk drive according to claim 12 wherein one end of said positioner includes gear teeth thereon to define said sector gear.

* * * * *